United States Patent
Canadas

[11] Patent Number: 6,052,929
[45] Date of Patent: Apr. 25, 2000

[54] MNEMONIC MARKING SYSTEM FOR FLUID VALVES AND THE LIKE

[76] Inventor: Herbert Canadas, 2830 Sloat Blvd., San Francisco, Calif. 94116

[21] Appl. No.: 09/151,641

[22] Filed: Sep. 11, 1998

[51] Int. Cl.[7] .............................. F16K 37/00; G09F 3/10; G09F 7/12
[52] U.S. Cl. ................................ 40/331; 40/332; 40/630; 40/638; 40/594; 116/277; 137/556.3
[58] Field of Search .............................. 40/331, 332, 630, 40/638, 594; 116/DIG. 21, 277; 283/81; 137/556.6, 556.3

[56] References Cited

U.S. PATENT DOCUMENTS

| | | | |
|---|---|---|---|
| D. 88,105 | 10/1932 | Petersen . | |
| D. 102,653 | 1/1937 | Meyer . | |
| D. 146,664 | 4/1947 | Kniep, Jr. | D56/4 |
| D. 186,992 | 1/1960 | Dreyfuss | D49/1 |
| D. 186,994 | 1/1960 | Dreyfuss | D49/1 |
| D. 186,995 | 1/1960 | Dreyfuss | D49/1 |
| D. 193,756 | 10/1962 | Parker | D91/3 |
| D. 203,795 | 2/1966 | Harvey et al. | D91/3 |
| D. 232,768 | 9/1974 | Mishiro | D56/4 B |
| D. 330,754 | 11/1992 | Gottwald | D23/254 |
| D. 332,826 | 1/1993 | Rosenbaum | D23/254 |
| D. 345,004 | 3/1994 | Bengtson | D32/254 |
| 1,742,229 | 1/1930 | Wood . | |
| 2,767,681 | 10/1956 | Pontius | 116/277 |
| 3,115,896 | 12/1963 | Roberts et al. | 137/556.6 X |
| 3,136,294 | 6/1964 | Arnold et al. | 116/DIG. 21 X |
| 3,238,968 | 3/1966 | Pecis | 116/277 X |
| 3,356,105 | 12/1967 | Ferguson | 137/556.3 |
| 3,421,474 | 1/1969 | Demi | 116/277 |
| 3,430,377 | 3/1969 | Ellison | 40/332 |
| 3,756,191 | 9/1973 | Olah | 116/124.1 R |
| 3,769,933 | 11/1973 | Fox | 40/331 X |
| 3,831,549 | 8/1974 | Parsons | 116/124.1 |
| 4,167,702 | 9/1979 | Shichijo | 325/455 |
| 4,202,351 | 5/1980 | Biche | 128/696 |
| 4,225,971 | 9/1980 | Shichijo et al. | 455/155 |
| 4,235,459 | 11/1980 | Callahan | 283/81 X |
| 4,479,319 | 10/1984 | Erlich | 40/595 |
| 4,580,360 | 4/1986 | Gribb | 40/638 |
| 4,959,720 | 9/1990 | Duffield et al. | 358/191.1 |
| 5,045,947 | 9/1991 | Beery | 358/192.1 |
| 5,058,959 | 10/1991 | Miles et al. | 40/638 X |
| 5,253,067 | 10/1993 | Chaney et al. | 358/191.1 |
| 5,423,573 | 6/1995 | De Passille | 40/638 X |
| 5,477,632 | 12/1995 | Choi | 40/630 |
| 5,487,408 | 1/1996 | Pokhis | 137/556.3 |
| 5,492,077 | 2/1996 | Rose | 116/307 |
| 5,562,231 | 10/1996 | Lambelet, Jr. et al. | 221/5 |
| 5,622,758 | 4/1997 | Hollis et al. | 428/40.1 |

*Primary Examiner*—Terry Lee Melius
*Assistant Examiner*—Rodrigo J. Morales
*Attorney, Agent, or Firm*—David Pressman; John S. Heyman

[57] ABSTRACT

A mnemonic temperature marking system for fluid valves, especially of the type used in bathing vessels such as bathtubs and showers. Any user can easily, quickly, and accurately set the valve so that water of the desired temperature will flow when the valve is adjusted so that the marker is aligned with a pointing arrow on the valve. The marking system comprises a plurality of individual, personalized, or unique markers (16). Users of the bathing vessel adhere the markers to the valve (knob (14) or escutcheon (10)) at respective positions where such users' desired water temperature settings are adjacent the valve's fiducial marker (12). The markers can comprise graphic symbols (16', 26), letters (32), or markers (34) which can have a plurality of letters (for initials of a user) adhered.

8 Claims, 2 Drawing Sheets

MNEMONIC MARKING SYSTEM FOR FLUID VALVES AND THE LIKE

BACKGROUND—FIELD OF INVENTION

This invention relates generally to fluid valves, specifically to facilitating the temperature setting of water values used in bathing vessels, such as showers and bathtubs.

BACKGROUND—PRIOR ART

Bathers (those taking a shower or bath, or simply washing their hands and/or face) use tubs, showers, and sinks which have either a single, mixing valve, or separate hot and cold valves. If the vessel has a single mixing valve, hot and cold supply pipes feed it and it has a single output pipe to supply the admixed hot and cold water at a temperature suitable for bathing. If the vessel has separate hot and cold valves, a single supply pipe feeds each valve and each valve has a single output pipe. The resultant hot and cold output pipes are coupled to feed, via a T fitting or a Y fitting, a single supply pipe that feeds the showerhead or a single tub outlet pipe. In older bathtubs and many sinks where separate hot and cold valves are usually used, each may have its own outlet pipe, so that hot and cold water streams flow from such respective outlets and such streams are admixed in the actual tub or sink.

Heretofore whether the vessel had one or two valves, or whether the vessel was a tub, shower, or sink, the bather had to adjust the water valve or valves by trial-and error to admix the incoming water to a comfortable temperature. The bather experienced many disadvantages of this trial-and-error process.

First, the bather found it difficult to provide a consistent temperature control for each bathing session since the bather had to rely on a sense of feel each time. As is well known, a bather's sense of feel for temperature is inconsistent.

Second, bathers waste much time and water in adjusting the valve or valves to a comfortable temperature each time. They must wait until each trial setting arrives at a final value, and fiddle with the valve until the admixed water reaches the desired temperature.

Third, if bather initially set the valve at too low a temperature, the bather had to feel the shock and discomfort of cold water. If the bather set it too hot, the bather could get scalded. Cold water shock and scalding are especially uncomfortable and harmful to the elderly, the obtunded, children and babies, etc. Moreover guests who are unfamiliar with a bathing vessel's valve settings could inadvertently draw water which is far too hot, thereby injuring themselves, sometimes severely, creating liability to the owner of the vessel. Also even if the user draws a cold stream, the owner could be liable if the guest slipped and fell from the shock of the cold stream.

Fourth, bathers must engage in guesswork to get the proper temperature. Busy executives, students, and homemakers taking an urgent shower in the morning are in no mood for guessing games.

Some valves, particularly mixing valves, have factory embossed or installed settings, such as C (Cold), W (Warm), and H (Hot), but these are notoriously inaccurate and imprecise. Thus the bathers can't use them to set a consistently comfortable temperature, especially since such valves are installed on different plumbing systems, which may have different water heaters, different hot water temperatures, different flow rates and water pressures, etc. Also while such valves have factory embossed or installed reference pointers (usually an arrow or triangle) to which the desired temperature setting is rotated, such pointers may be in a position which is difficult for the bather to see, so that they are useless.

Also, bathers must rotate some valves to set the desired temperature and must then pull out to turn on the water. If no one changes the rotational position of these valves between uses, they can maintain a desired water temperature. However in practice several users with different water temperature preferences will usually employ the bathing vessel, so that they will change the rotational setting between uses. As a result, the same problems that exist above for non-pull-out valves will remain.

OBJECTS AND ADVANTAGES

Accordingly, several objects and advantages of the invention are:

to eliminate the need for a bather to adjust the water valve or valves for the bathing vessel by trial-and error to admix the incoming water to a comfortable temperature, to provide a consistent temperature control for each bathing session, to eliminate the need for the bather to rely on a sense of feel each time, to eliminate the need for bathers to waste time and water in adjusting the valve or valves to a comfortable temperature each time, to eliminate any shock and discomfort to the bather from cold water, to eliminate any scalding or injury of the bather from hot water, especially to the elderly, the obtunded, children and babies, etc., to reduce the possibility of liability to the owner of a bathing vessel from scalding, falls due to cold water shock, etc., to eliminate the need for bathers, especially busy executives, students, and homemakers taking an urgent shower in the morning to engage in guesswork to get the proper water temperature, to enable bathers to make more precise and consistently comfortable water temperature adjustments, particularly with mixing valves, especially for several different bathers, and, to enable bathers to avoid the difficulties (imprecision, inconsistency, and poor visibility) of valves with factory settings and pointers.

Additional objects and advantages are:

to personalize temperature settings for several different individuals for the water valve or valves for a bathing vessel, to make such valves easier to use, to provide a way to encourage children to set the temperature for their own bathing session, and to provide an aesthetically appealing addition to a bathing vessel with personalized, attractive, and enjoyable bath decor, designs, and symbols.

Further objects and advantages will become apparent from a consideration of the ensuing description and the accompanying drawings.

DRAWING FIGURES

Figure 1:
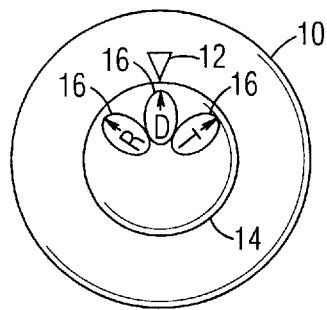
FIG. 1 is an elevational view of a single or mixing valve for a bathing vessel with a relatively flat knob having personalized individual temperature markers according to the invention.

REFERENCE NUMERALS 10 backplate or escutcheon
12 pointer
14 knob
16 markers
18 hot water knob
20 cold water knob
22 deep knob
24 handlelike knob
26 graphic symbol markers
28 pointers
30 temperature symbols
32 letters
34 blank markers
36 arrows

SUMMARY

In accordance with the invention, I provide a mnemonic temperature marking system for fluid valves, especially of the type used in bathing vessels such as bathtubs, showers, and sinks, so that any user can easily, quickly, and accurately set the valve to cause water of the desired temperature to flow. The marking system comprises a plurality of individual, personalized or unique markers. Users of the vessel adhere the markers to the valve (knob or escutcheon) at respective positions where such users' desired water temperature settings are adjacent the valve's pointer or fiducial marker. The markers can comprise graphic symbols, letters, or markers which can have a plurality of letters (for initials of a user) adhered.

DESCRIPTION—FIG. 1

Mixing Valve with Flat Knob Having Individual Temperature Markers

FIG. 1 shows the visible or outside portions of a typical known single-control or mixing valve for a shower or bathtub. A backplate or escutcheon 10 has an indicator or pointer 12. Pointer 12 may be an integral part of escutcheon 10 and may be formed by stamping, welding, etc., or it may be applied by the user from the kit of stick-on markers and pointers of FIGS. 5 and 6, to be discussed below. The valve also comprises a rotary knob 14 that the user may turn in the usual fashion to turn on the water and increase its temperature. In some valves, the user pulls out knob 14 to turn on the water and rotates the knob to adjust the temperature.

Ignoring the lettered markers on knob 14 temporarily, I have found that the valve of FIG. 1 has the serious disadvantages noted above. I.e., the bather must adjust the valve by trial-and error to admix the incoming water to a comfortable temperature. Bathers find it difficult to provide a consistent temperature control for each bathing session since they must rely on a sense of feel each time. Also bathers waste much time and water in adjusting the valve or valves to a comfortable temperature. If bather makes the initial setting too low, the bather must feel the shock and discomfort of cold water, and the bather makes it too hot, the bather can get scalded. The bather must engage in guesswork to obtain water of the proper temperature. Even if the valve has settings such as C (Cold), W (Warm), and H (Hot), these are not adequate since they are inaccurate, inconsistent, and imprecise and thus the bather cannot use them to set a consistently comfortable temperature, especially when several different bathers use the vessel.

In accordance with the invention, I provide a plurality of different individualized markers 16 that the users of the shower can stick onto the knob at respective positions adjacent pointer 12 when the knob is at their respective desired temperature settings.

Each marker 16 is oval in shape and includes an indicium or symbol, namely a Latin letter and an arrow above the letter in FIG. 1, pointing to a point at the top of the oval, in line with the center of the letter. In practice, preferably a set (not shown) of oval markers like markers 16, one for each letter of the alphabet, are supplied with a sticky backing on a sheet of release paper backed by a sheet of cardboard. Each marker may be made of a suitable waterproof material, such as plastic, aluminum, brass, stainless steel, chrome-plated brass, etc. The stickum used on the backs of the markers is waterproof.

Although the three markers 16 are positioned contiguously, their arrows are relatively widely separated in knob 16. This is because of the need to illustrate the letters in markers 16 clearly, yet not make the figure too large. In actuality the markers would be smaller in relation to the size of the knob, so that they can be spaced closer together, if necessary. A typical knob 14 is about 7 cm in diameter and markers 16 are preferably about 3 mm wide, with a proportional height as shown.

FIG. 1

Operation

To use the present system, each user adheres their own marker when temperature-control knob 14 is set to cause the valve to supply water at the desired temperature. I.e., each user must install a marker in alignment with the valve's pointer when the user has set the knob to the user's desired temperature setting.

E.g., say user D of the shower wants to set a marker on user D's desired position. User D peels off marker D from a peel-off sheet, in accordance with the first letter of this user's given name. While the sheets of FIGS. 6 and 7 have markers with different shapes and symbols than those shown in FIG. 1 in order to illustrate a variety of markers, the principle employed is the same. Each user must keep the marker and the knob dry until they adhere it. User D then adjusts the knob until the shower water is at user D's desired temperature. Then user D adheres the marker onto knob 14 adjacent pointer 12, as shown in FIG. 1.

Each additional user of the bathing vessel also adheres an individual marker according to the first letter of their given name. If two users have first names with the same first letter, such as Dora and David, each can select a letter according to the last or second letter of their name. If two users prefer the same temperature setting, they can select a single letter according to the name of the senior user, or a letter that is common to both names. If two users prefer different temperature settings which are closer than the spacing between the arrows of two adjacent markers, they can select a marker according to the previous sentence and place it between their desired positions and remember to make a suitable slight adjustment (hotter or colder).

User R has placed their marker R to the left of marker D, indicating that user R must rotate the valve farther clockwise to a hotter temperature setting to cause marker R to be adjacent the pointer. This indicates that user R prefers a hotter temperature than user D. Marker T is positioned to the right of marker D, indicating that user T must rotate the knob counterclockwise to bring this marker adjacent pointer 12; this indicates that user T prefers a lower temperature than user D.

After any user has placed a marker in the desired position, the next time such user takes a shower, such user need merely turn knob 14 so that their marker is adjacent pointer 12. The valve will automatically and consistently provide water at that user's preferred temperature. The user need not make any trial-and-error adjustments, rely on a sense of feel, waste time and water, or endure shockingly cold or scalding hot water.

Due to variations in water pressure and temperature of the hot and cold sources, occasionally the shower water may not be admixed to the user's preferred temperature, but this can be easily remedied, when it occurs, by a slight adjustment.

DESCRIPTION AND OPERATION—FIG. 2

Dual Valves with Flat Knob Having Temperature Markers

Figure 2:
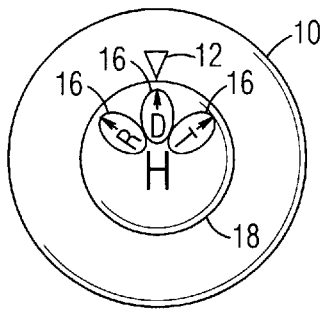
FIG. 2 is an elevational view of a set of dual valves (hot and cold) with personalized markers similar to those of FIG. 1 and according to the invention.
Figure 2:
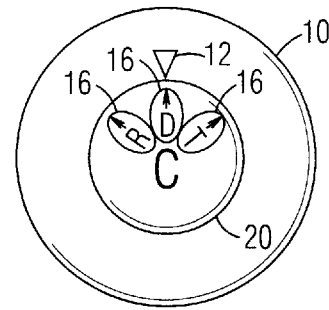
Figure 2:
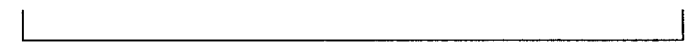

The present mnemonic system is also applicable to two-valve systems, as shown in FIG. 2, an elevational view of the external knobs and escutcheon of a two-valve arrangement.

FIG. 2 shows hot and cold valves, with respective escutcheon 10 and pointers 12 similar to those of FIG. 1. Knob 18 adjusts the volumetric flow of hot water and knob 20 adjusts the cold water. The hot and cold water streams combine, either in a single shower head or tub supply pipe (not shown), or in the tub, from separate supply pipes, to provide warm water at the user's desired temperature.

Three markers 16 are adhered to each of knobs 18 and 20 at the desired temperature settings. The procedure for installation of these markers is similar to that used in connection with the valve of FIG. 1, except that it is done twice. Each user first obtains two identical markers with their initial, and then adjusts the hot and cold valves so that the desired water temperature flows out if the valve has a single outlet. If the valves supply a two-outlet vessel, the user adjusts the valves so that the two flows from the separate outlets combine to the desired temperature. In the case of vessel with a single outlet, the user should adjust the valves so that the single outlet supplies water at a slightly hotter temperature than desired since some cooling will occur as the vessel will draw some heat from the water.

After user adjusts the valve knobs, the user adheres both markers adjacent pointers 12 on knobs 18 and 20. On subsequent bathing sessions, the user need merely adjust the knobs until their markers are adjacent pointers 12. The water will flow from the outlet or outlets at the desired temperature.

The present system is particularly useful in two-valve bathing vessels due to the increased difficulty of adjusting two valves to supply water at the desired temperature and flow rate.

DESCRIPTION & OPERATION—FIG. 3

Single Valve with Deep Knob Having Temperature Markers

Figure 3:
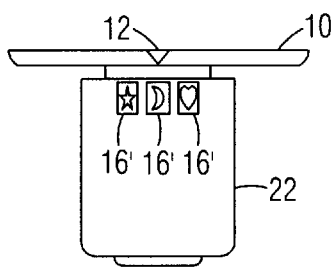
FIG. 3 is a top view of a single or mixing valve with a deep knob with personalized individual temperature markers according to the invention.

To illustrate how the markers are used on a deep-knob valve, FIG. 3 shows a top view of the knob and escutcheon of such a valve. The valve has the usual escutcheon 10 with a pointer 12 and a deep knob 22, which may contain internal valving. A set of markers 16' has been attached in the same manner as those of FIG. 1, except that the users have attached markers to the deep side of the knob, adjacent escutcheon 10 and its pointer 12, rather than the front face (not shown) of the knob, which is relatively distant from escutcheon 10 and pointer 12. Also, each marker contains a graphic symbol, rather than the Latin letters of FIG. 1. The user may prefer such symbols, rather than letters, although the user can use either with any embodiment. The symbols shown, a star, moon sector, and heart, represent three different users who have chosen three different temperature settings, as with the embodiment of FIG. 1. These three symbols, and others, are on the peel-off sheet of FIG. 6.

The valve of FIG. 3 may be of the thermostatic type, which can vary the proportions of hot and cold water admixed to provide output water having a constant temperature. The markers are still useful with such a valve in order to mark each user's preferred temperature setting in a definitive manner.

DESCRIPTION AND OPERATION—FIG. 4

Single Valve with Temperature Markers On Escutcheon

Figure 4:
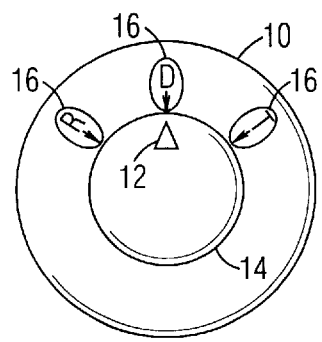
FIG. 4 is an elevational view of a single or mixing valve with an escutcheon having personalized individual temperature markers according to the invention.

The valve of FIG. 4 is identical to the one shown in FIG. 1, except that pointer 12 is on knob 14, rather than escutcheon 10, and markers 16 are on escutcheon 10, rather than on knob 14. This illustrates that the markers and pointer can be interchanged. The users apply the markers in the same way as with FIG. 1, except that the users apply them to the escutcheon, adjacent the pointer on knob 14 after each user sets the knob to provide water of the desired temperature.

The manufacturer may supply the valve with pointer 12 already permanently installed on knob 14. However if not, the user can peel off a pointer from the sheet of FIGS. 6 or 7 and apply this to the knob. Even if the manufacturer installs a pointer on the escutcheon or knob, the user may not be able to see such pointer clearly, so they may apply a pointer from the sheets of FIGS. 6 or 7 in a more visible location.

An advantage of the arrangement of FIG. 4 is that escutcheon 10 provides a longer distance on which to apply the markers. Therefore users can be apply them with greater resolution.

DESCRIPTION & OPERATION—FIG. 5

Handlelike Knob with Markers on Backing Surface

Figure 5:
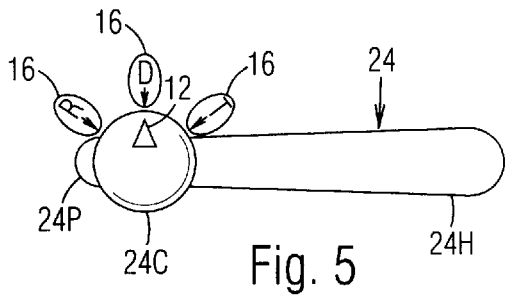
FIG. 5 is an elevational view of a valve with a handlelike knob and a backing surface having personalized individual temperature markers according to the invention.

The valve of FIG. 5 has an elongated handlelike knob 24 with a handle portion 24H, a circular center portion 24C, and a short pointer 24P on the opposite side of center portion 24C from handle portion 24H. The valve may be a single-knob mixing valve, or one valve in a two-valve (hot and cold) set. The valve may be installed in any vessel, such as a sink, a tub, or a shower. In addition to the elongated- or bar-shape shown, it can have shapes, such as circular, square, triangular, octagonal, etc.

The valve's knob is shown in the off position. Three users have applied three markers 16 to the knob's backup surface behind the knob at their desired positions. The backup surface may be a wall of a shower behind the knob, the wall of a tub or sink, or part of an escutcheon (not shown). When the user turns the knob slightly clockwise, its pointer 24P will be at the R marker, indicating that user R prefers a colder temperature. User D would turn the knob further to marker D, a warmer temperature, and user T would turn it still further to marker T, a yet warmer temperature.

If the backing surface is not flat, or if other hardware is at the positions desired for the markers, the user can apply pointer 12 to center portion 24C in any position where it will point to a usable area of the backing surface. In this case the bathers will use pointer 12 in lieu of the valve's pointer 24P.

DESCRIPTION AND OPERATION—FIGS. 6 AND 7

Sheets with Peel-Off Markers and Pointers

One or more sheets with peel-off markers and pointers are provided as a kit for the system of the invention.

Figure 6:
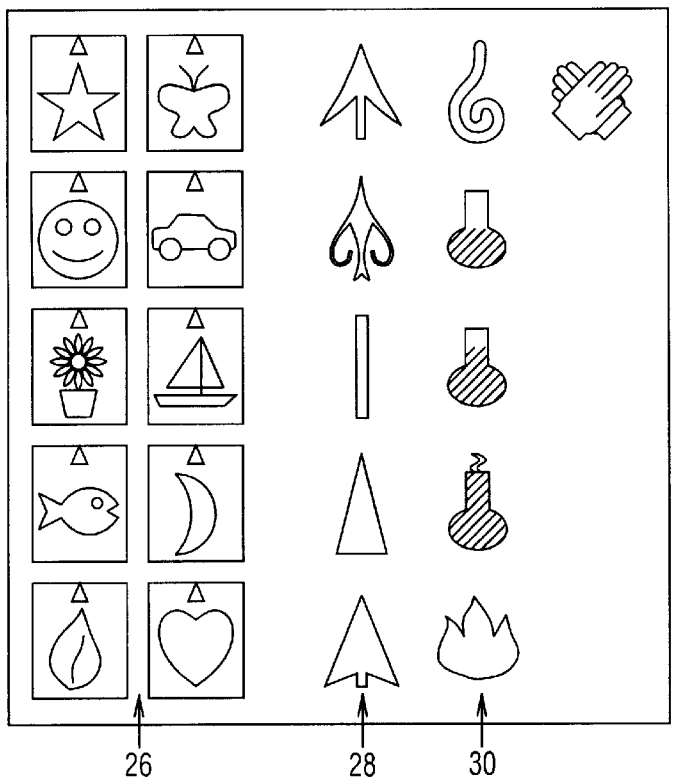
FIG. 6 is a plan view of a sheet with a set of peel-off and adhereable valve temperature markers of the graphical symbol type according to the invention.

The sheet of FIG. 6 comprises two columns of graphic symbol markers 26, each with its own pointing arrow. Users can select any desired marker from this sheet and apply it at their desired temperature position on the valve, as described. Markers 26 are each imprinted on their own peel-off square, which also contains a pointing arrow. When peeled off, each square can be adhered to the valve's knob or escutcheon. However each marker can be directly adhered to the sheet, with its pointing arrow extending from the top of the marker.

The sheet also contains a series of pointers 28 (third column and top symbol of fourth column) for use with valves that have no pointer of their own, or where the position of the valve's pointer is not suitable, as described above. The users mount these pointers and the temperature symbols—see next paragraph—directly on the sheet, without any square since they have no pointing arrows.

Lastly the sheet contains (bottom four symbols of fourth row and symbol on fifth row) a series of temperature-indicating symbols which can also be added to any valve (along with the individual markers) to indicate temperature settings. These are more meaningful and less abstract than the usual "H" and "C" letters. I.e., the flame symbol at the bottom of the fourth row obviously indicates very hot water, as does the full flask above it. The next two flasks (slightly empty and half empty) indicate successively lower temperature settings. The washing hands symbol (fifth row) indicates a comfortable temperature for hand washing.

Each sheet preferably comprises a stiff backer of cardboard overlaid by a release sheet, followed by the peel-off markers and pointers. The markers and pointers and their adhesive are waterproof.

Figure 7:
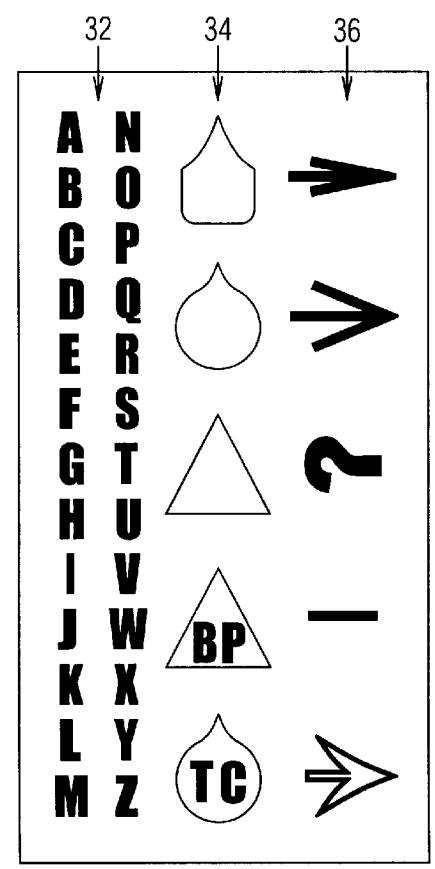
FIG. 7 is a plan view of a sheet with a set of peel-off and adhereable valve temperature markers, mainly of the Latin character symbol type, according to the invention.

The sheet of FIG. 7 comprises (first two columns) a series of the letters of the alphabet 32 that are adhered directly to the sheet. These may be peeled off and adhered directly to the knob or escutcheon. However since they have no arrows, they are preferably first adhered in pairs to one of blank markers 34 (third column), which are then adhered to the valve. Alternatively letters 32 may have small pointers extending from their tops (not shown), so that they will point to a well-defined spot on the escutcheon or knob. Blank markers 34 are large enough to accommodate two letters, as illustrated by the bottom two symbols of the third column. The sheet also contains a series of pointer arrows 36 that may be peeled off and directly applied to the valve.

A marking kit preferably also includes a sheet with letter symbols on ovals, as shown in FIGS. 1, 2, 4, and 5. However such a sheet has not been shown since it would be similar to the sheets of FIGS. 6 and 7, except for the different symbols.

CONCLUSION, RAMIFICATIONS, AND SCOPE

Accordingly the reader will see that, according to the invention, I have provided a way for a bather to eliminate the need to adjust the water valve or valves for a bathing vessel by trial-and error to admix the incoming water to a comfortable temperature. Also I provide a consistent temperature control for each bathing session. I have also eliminated the need for the bather had to rely on a sense of feel each time, and the need for bathers to waste time and water in adjusting the valve or valves to a comfortable temperature each time. I have further eliminated any shock and discomfort to the bather from cold water, any scalding or injury of the bather from hot water, especially to the elderly, the obtunded, children and babies, etc., the possibility of liability to the owner of a bathing vessel from scalding, falls due to cold water shock, etc., and the need for bathers, especially busy executives, students, and homemakers taking an urgent shower in the morning to engage in guesswork to get the proper water temperature. My system enables bathers to make more precise and consistently comfortable water temperature adjustments, particularly with mixing valves, especially for several different bathers. Personalized temperature settings for several different individuals for the water valve or valves for a bathing vessel can be provided, bathing valves are easier to use, the system encourages children to set the temperature for their own bathing session, and I have provided an aesthetically appealing addition to a bathing vessel with personalized, attractive, and enjoyable bath décor, designs, and symbols. The present system avoids the imprecision, lack of consistency, and sometimes poor visibility of factory installed markers and pointers.

While the above description contains many specificities, these should not be construed as limitations on the scope of the invention, but as exemplifications of the presently preferred embodiments thereof. Many other ramifications and variations are possible within the teachings of the invention. For example, different symbols, graphic or letters, can be provided and the markers can be provided in different colors. In lieu of stick-on markers, they can be silk-screened on with a stencil. In lieu of temperature marking on water valves, the system can be used for other types of individualized marking on adjustable controls, such as volume setting of amplifiers, lamp brightness settings, etc. In lieu of adhesive on the backs of the markers, screws, rivets, snap-on fittings, etc can be used to attach them. In lieu of flat markers with a flat back, they can have a non-flat back and can be thick or raised and can have a tactile distinguishing feature. E.g., the markers can be a pyramid, a square, a half-sphere, etc. In lieu of a rotary control, the system is equally applicable to a linear control.

Thus the scope of the invention should be determined by the appended claims and their legal equivalents, and not by the examples given.

I claim:

1. A method of enabling a plurality of users of an adjustable fluid valve control that includes a pointer means and hot and cold indicators to rapidly set said control to said users' respective different preference settings, comprising:

providing a plurality of peel-off individual markers on a sheet, each of said markers having a distinctive, different indicium thereon for representing each of said plurality of users, said markers each being unique and not part of any scale, selecting by said users an individual marker from said sheet of peel-off markers so as to personalize said marker for each respective user, peeling off said selected, individual and personalized marker from said sheet of markers, and each user attaching one of said selected individual and personalized markers to said control at a unique location on said control opposite said pointer means whereby rapid setting of said control to said users' respective different preference settings is effected.

2. The method of claim 1 wherein said adjustable control is a water valve on a bathing vessel.

3. The method of claim 1 wherein the indicia on said markers are selected from a group consisting of letters and graphic symbols.

4. The method of claim 1 wherein said markers are attached to said control by adhering each marker.

5. The method of claim 1 wherein said adjustable control comprises a moveable knob and a stationary part located near said knob and wherein said markers are attached to said knob.

6. The method of claim 5 wherein said stationary part is an escutcheon adjacent said knob.

7. The method of claim 1 wherein said adjustable control comprises a moveable knob and a stationary part located near said knob and wherein said markers are attached to said stationary part.

8. The method of claim 7 wherein said stationary part is an escutcheon adjacent said knob.

* * * * *